United States Patent [19]

Lundqvist et al.

[11] Patent Number: 5,640,679
[45] Date of Patent: Jun. 17, 1997

[54] METHOD AND AN APPARATUS FOR HANDING OFF MOBILE STATION FROM A FIRST TO A SECOND CHANNEL IN A MOBILE COMMUNICATION SYSTEM

[75] Inventors: Nils Patrik Lundqvist; Claes Håkan Andersson, both of Ekerö, Sweden

[73] Assignee: Telefonaktiebolaget LM Ericsson, Stockholm, Sweden

[21] Appl. No.: 612,672

[22] Filed: Mar. 8, 1996

Related U.S. Application Data

[63] Continuation of Ser. No. 203,028, Feb. 28, 1994, abandoned.

[30] Foreign Application Priority Data

Jan. 3, 1993 [SE] Sweden ................... 9300681

[51] Int. Cl.$^6$ ................... H04B 7/26; H04J 3/16
[52] U.S. Cl. ................... 455/33.2; 455/54.1; 455/56.1; 379/60; 370/331; 370/337
[58] Field of Search ................... 455/33.1, 33.2, 455/51.1, 54.1, 56.1; 379/60; 370/95.1, 95.3, 100.1, 105.2, 105.3, 108; 375/205

[56] References Cited

U.S. PATENT DOCUMENTS

| | | | |
|---|---|---|---|
| 3,593,138 | 7/1971 | Dunn et al. | 455/11.1 |
| 4,414,661 | 11/1983 | Karlstrom | 455/33.1 |
| 4,472,802 | 9/1984 | Pin et al. | 370/95.3 |
| 4,475,010 | 10/1984 | Huensch et al. | 370/94.1 |
| 4,608,711 | 8/1986 | Goldman | 455/33.2 |
| 4,642,806 | 2/1987 | Hewitt et al. | 370/95.3 |
| 4,694,453 | 9/1987 | Kobayashi et al. | 370/95.3 |
| 4,696,027 | 9/1987 | Bonta | 455/33.2 |
| 4,765,753 | 8/1988 | Schmidt | 455/33.2 |
| 4,797,947 | 1/1989 | Labedz | 379/60 |
| 4,811,380 | 3/1989 | Spear | 379/60 |
| 4,866,710 | 9/1989 | Schaeffer | 455/33.2 |
| 5,042,082 | 8/1991 | Dahlin | 455/33.2 |
| 5,228,029 | 7/1993 | Kotzin | 370/95.1 |
| 5,355,367 | 10/1994 | Comroe et al. | 455/33.1 |
| 5,355,515 | 10/1994 | Sichner | 455/33.2 |

FOREIGN PATENT DOCUMENTS

| | | |
|---|---|---|
| 430106 | 11/1990 | European Pat. Off. . |
| 444485 | 2/1991 | European Pat. Off. . |
| 60-90441 | 5/1985 | Japan . |
| WO92/22966 | 12/1992 | WIPO . |

OTHER PUBLICATIONS

GSM Recommendation 05.10, Version 3.5.0, "Radio Sub-System Synchronization"0 (Jan. 1991).
EIA Project No. 2215, IS–54, "Cellular System, Dual–Mode Subscriber Equipment —Network Equipment Compatibility Specification" pp. 2–56–2–58 (Dec. 1989).
M. Hata, "Empirical Formula for Propagational Loss in Land Mobile Radio Services", IEEE Trans. on Veh. Tech., vol. VT–29, No. 3, pp. 317–325 (Aug. 1980).

*Primary Examiner*—Reinhard J. Eisenzopf
*Assistant Examiner*—Thanh Le
*Attorney, Agent, or Firm*—Burns, Doane, Swecker & Mathis, L.L.P.

[57] ABSTRACT

In a mobile communication system, a method and an apparatus for handing off a mobile station from a first channel on a serving base station to a second channel on a target base station, the mobile station transmitting at a first transmission phase on the first channel, the second channel being ready to take over the communication with the mobile station transmitting at a second transmission phase. A device for determining a time offset is provided in the target base station and is adapted to tune in to the mobile station for determining, prior to a handoff, the time offset between the first transmission phase and the second transmission phase. Also, a device is provided for shifting, upon handoff, the transmission phase of the mobile station by the determined time offset relative to the first transmission phase.

10 Claims, 3 Drawing Sheets

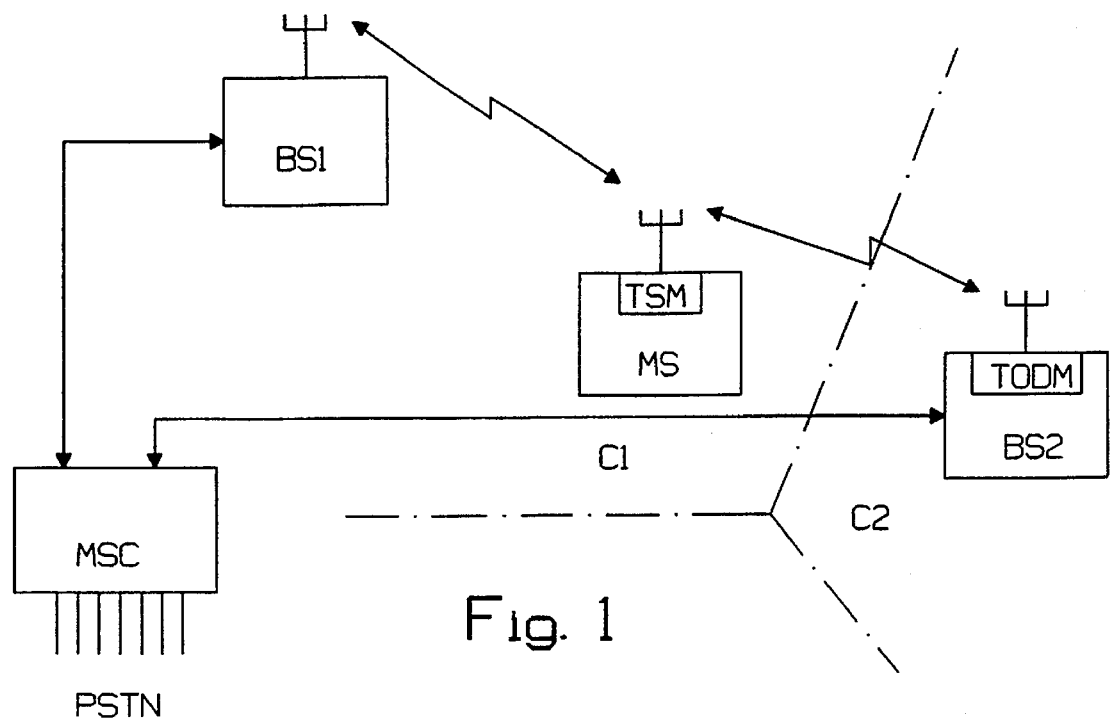
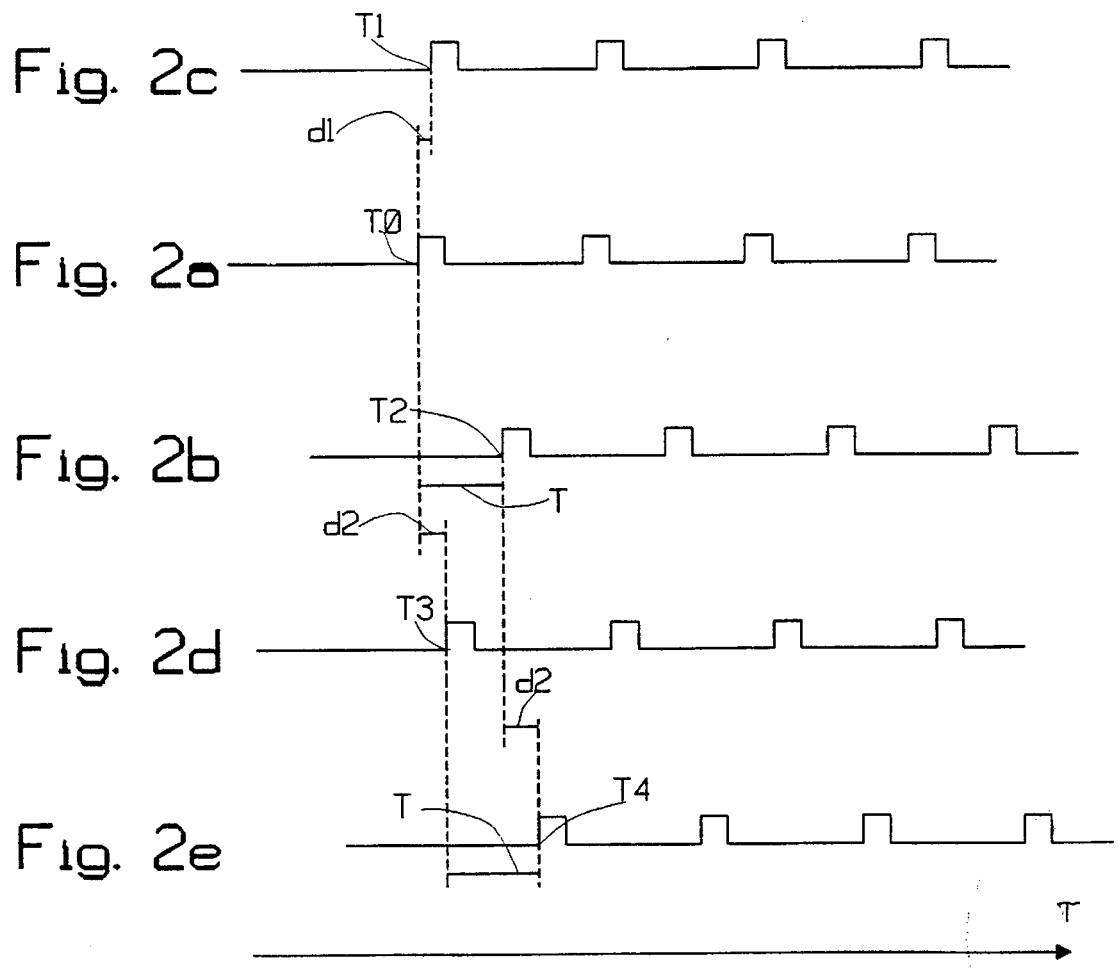

METHOD AND AN APPARATUS FOR HANDING OFF MOBILE STATION FROM A FIRST TO A SECOND CHANNEL IN A MOBILE COMMUNICATION SYSTEM

This application is a continuation of application Ser. No. 08/203,028, filed Feb. 28, 1994, abandoned.

BACKGROUND

The invention relates to a method for handing off a mobile station from a first channel on a serving base station to a second channel on a target base station in a mobile communication system. The method also includes handing off the mobile station from the first channel to the second channel in the serving base station. The mobile station is transmitting at a first transmission phase on said first channel, said second channel being ready to take over the communication with said mobile station transmitting at a second transmission phase. The invention also relates to an apparatus for carrying this method into effect.

In a mobile communication system, e.g. a cellular mobile radio system, an inter-cell handoff is the actual switching of an ongoing call from a base station in one cell to a base station in another cell, while an intra-cell handoff is the actual switching of a connection from one channel to another channel in one and the same base station.

Inter-cell handoffs are performed in order to effect a change of base station, e.g. due to the mobile station moving in a cellular environment, or to relocate some traffic from a highly loaded base station to a less loaded base station.

An intra-cell handoff takes place e.g. if the quality on the currently used channel falls below the minimum accepted quality or during a call set-up procedure when handing off the mobile station from a control channel to a traffic channel.

When an inter-cell or intra-cell handoff is performed between unsynchronized channels or between channels having a phase difference unknown to the mobile station, the mobile station must resynchronize itself on to the new channel. This resynchronization process takes considerable time, e.g. 200 ms, resulting in a non-negligible interruption of the speech signal which can cause disturbing interruptions in the ongoing speech.

The patent application WO 9222966 shows a method in a cellular mobile radio telephone system for initially setting a time alignment parameter in a mobile station. The method comprises the steps of estimating an optimal time alignment parameter for use during communication on a new traffic channel of a desired base station, sending the estimated time alignment parameter to the mobile station, and setting the time alignment value in the mobile station.

The patent application EP 0430106 A2 shows a method for hand over in a mobile telephone system, by using mobile stations with two local oscillators. By having two local oscillators it is possible to receive on a first channel and at the same time transmitt on another channel. This can be used to reduce the time duration of making a hand over.

SUMMARY

The object of the invention is to bring about a method and an apparatus for speeding up the process of handoff between base stations. A further object is to speed up the set up of a connection by speeding up the handoff from a control channel to a traffic channel. A still further object is to speed up handoff between traffic channels in a common base station, to avoid interruptions in the communication in a handoff process, and to avoid the process of resynchronization.

This is attained by the method according to the invention mainly by, prior to a handoff, determining, by tuning into said mobile station in said target base station, the time offset between said first transmission phase and said second transmission phase, and, upon handoff, shifting the transmission phase of said mobile station by said determined time offset relative to said first transmission phase.

This is also attained by the apparatus according to the invention which comprises a time offset determining means provided in said target base station and adapted to tune in to said mobile station for determining, prior to a handoff, the relative time offset between said first transmission phase and said second transmission phase, and a time shifting means for shifting, upon handoff, the transmission phase of said mobile station by said determined time offset relative to said first transmission phase.

Examples of mobile communication systems where the invention can be used are systems utilising frequency division (FDMA), time division (TDMA), coding (CDMA) and the so called DECT-system.

One of the advantages with the invention is that the process of resyncronization is avoided, resulting in a reduction in calculation, which saves computer capacity. Another advantage is that the speech quality is improved, due to that an interruption of the speech channel is avoided.

BRIEF DESCRIPTION OF DRAWING

The invention will be described more in detail below with reference to the appended drawings, on which FIG. 1 is a schematical illustration of a mobile radio system, FIGS. 2a–2e show exemplary different transmission phases occuring during a handoff in the mobile radio system according to FIG. 1.

DETAILED DESCRIPTION

FIG. 1 is a schematical illustration of a mobile radio system in which the method and the apparatus according to the invention are utilized.

The mobile radio system shown in FIG. 1 comprises two base stations BS1 and BS2 which are located in adjacent cells C1 and C2.

The base stations BS1 and BS2 are connected e.g. by cables to a mobile services switching centre MSC or any other type of switching/controlling unit, such as a base station controller (BSC), a mobile telephone switching office (MTSO), etc., used in cellular communication.

The mobile services switching centre MSC is connected e.g. by cables to a fixed public switched telephone network PSTN also in a manner known per se.

It is to be understood that many more base stations than shown may be connected to the mobile services switching centre MSC.

In FIG. 1, a single mobile station MS is shown. However, it should be understood that many more mobile stations may be present in the mobile radio system according to FIG. 1.

The mobile station MS is supposed to be communicating with the currently serving base station BS1 on a digital traffic channel CH1 and transmitting at a transmission phase T0 as shown in FIG. 2a. In FIG. 2a–e the time is denoted by τ. The transmission of the mobile station MS is received, delayed due to a propagation delay d1, in the base station BS1 at a transmission phase T1 as shown in FIG. 2c.

The base station BS1 supervises the channel CH1 by monitoring e.g. the signal strength and/or the bit error rate.

Figure 3:
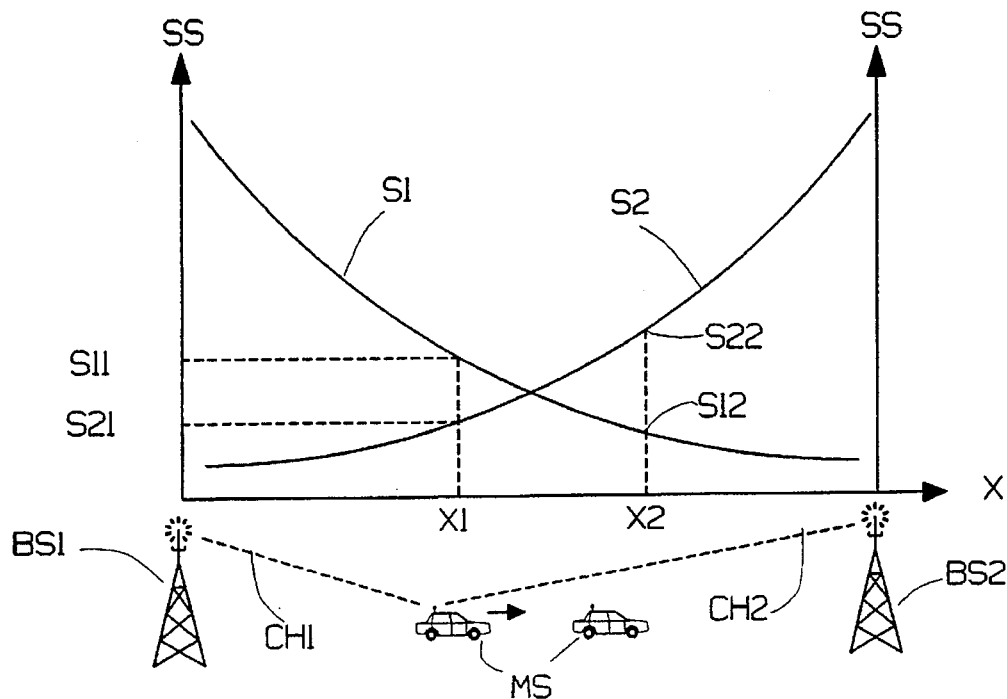
FIG. 3 shows a diagram, in which signal strength is used to determine when to make a handoff.

FIG. 3 shows a diagram of the variation of the signal strength SS from the base stations BS1 and BS2 with the position of the mobile station MS from the base station BS1.

The mobile station monitors the quality (e.g. signal strength) of the channel CH1 belonging to the base station BS1 and the quality of the channel CH2 belonging to the base station BS2.

The distance between the mobile station MS and the base station BS1 is denoted by X. A curve S1 shows the signal strength from the base station BS1 and a curve S2 shows the signal strength from the base station BS2. The mobile station MS has contact via the traffic channel CH1 with the base station BS1 and moves in direction towards the base station BS2. In a first position X1 the signal strength from the base station BS1 is S11, and the signal strength from the base station BS2 is S21. Since the signal strength S11 is greater than the signal strength S21 the communication with the base station BS1 continues. In a second position X2 the signal strength S12 from the base station BS1 is less than the signal strength S22 from the base station BS2, resulting in a handoff from the base station BS1 to the base station BS2. The mobile station MS measures regularly the signal strength from the base stations and reports the results from the measurements via a control channel, for example the SACCH channel in the GSM-system, to a the mobile communication system. The results can for example be reported to the base stations BS1 and BS2 via a control channel or to any other type of switching/controlling unit, such as a base station controller (BSC), a mobile telephone switching office (MTSO), etc., used in cellular communication.

It should be obvious to one of ordinary skill in the art, that the mobile station MS can monitor the quality of the channel CH1 in other ways, e.g. by measuring the bit error rate (BER) instead of the signal strength in a similar way as is described above.

When the mobile station MS is connected via the channel CH1, the mobile station MS monitors the quality of the channel CH1, e.g. by measuring the bit error rate and/or the received signal strength S11 on the channel CH1. In addition, the received signal strength and/or the bit error rate on some given channels, e.g. channel CH2 located in neighbouring cells should be measured, for example the signal strength S21 from the base station BS2 in the cell C2. Such measurement are initiated in the mobile station MS by e.g. the base station BS1.

The measurements of the channels are compared e.g. in the base station BS1 or the mobile services switching centre MSC by looking at the received signal strengths and/or bit error rates BER reported by the mobile station MS via control channels.

If the comparison indicates that the connection is better served on another channel on the same base station BS1 or by another base station, e.g. base station BS2, the base station BS1 generates a handoff request to the mobile services switching centre MSC. In the latter case, the base station BS2, in its role as target base station, will be instructed to take over the communication with the mobile station MS on a channel CH2.

In an alternative preferred embodiment, base stations neighbouring the currently serving base station BS1, tune to the channel CH1 currently used by the mobile station MS and measures the received signal strength. The results of the measurements are reported to the mobile services switching centre MSC. If a comparison of the results indicates that the connection is better served by another base station, a handoff to this base station will be performed.

In FIG. 2a–e the square pulse indicates a burst in a TDMA-(Time Division Multiple Access)-system, even though the figures are representative for other systems as well, such as systems utilising frequency division (FDMA), coding (CDMA) and the so called DECT-system.

The desired transmission phase T2 of the mobile station MS on the channel CH2 is, as shown in FIG. 2b, displaced in time by a time offset T from the transmission phase T0 of the mobile station MS on the channel CH1, shown in FIG. 2a. The transmission phase T3 of the mobile station MS on channel CH1 as received, delayed due to a propagation delay d2, in the base station BS2 is shown in FIG. 2d. Shown in FIG. 2e is the transmission phase T4 of the mobile station MS as desired to be received, delayed due to the propagation delay d2, in the base station BS2.

As shown, the time offset T between the desired transmission phase of the mobile station MS on the channel CH2, FIG. 2b, and the transmission phase of the mobile station MS on channel CH1, FIG. 2a, is the same as the time offset T between the transmission phase of the mobile station MS on the channel CH2 as desired to be received in the base station BS2, FIG. 2e, and the transmission phase, as received in the base station BS2, of the mobile station MS on the channel CH1.

According to the invention, the time offset T between the transmission phase of the mobile station MS communicating on the channel CH1, as received in the base station BS2, FIG. 2d, and the desired transmission phase of the mobile station MS to be correctly received in the base station BS2 on the channel CH2, FIG. 2e, is determined in the base station BS2 by a time offset determining means TODM adapted to tune in to the mobile station MS. The time offset determining means TODM will be explained in the description of FIG. 4.

Prior to a handoff, the mobile station MS is informed about this time offset T or provided with information allowing the mobile station MS to establish the time offset T, e.g. in that the base station BS2 informs the mobile services switching centre MSC, which in its turn informs the base station BS1 which in its turn transmits this information about the time offset to the mobile station MS. This information can be sent by using a control channel, e.g. the SACCH channel.

Upon handoff, i.e. when the mobile station MS is to start communicating with the base station BS2, the mobile station MS is instructed to shift its transmission phase T0 according to FIG. 2a by the determined time offset T to fit the transmission phase T2 according to FIG. 2b on channel CH2.

To accomplish this the mobile station MS is provided with a time shifting means TSM adapted to shift the transmission phase of the mobile station MS by the determined time offset T. The time shifting means TSM will be explained below in the description of FIG. 4.

Hereby, the transmission phase of the mobile station MS will be adapted to the correct transmission phase on the channel CH2 without any need of resynchronization prior to the initial transmission on channel CH2.

Figure 4:
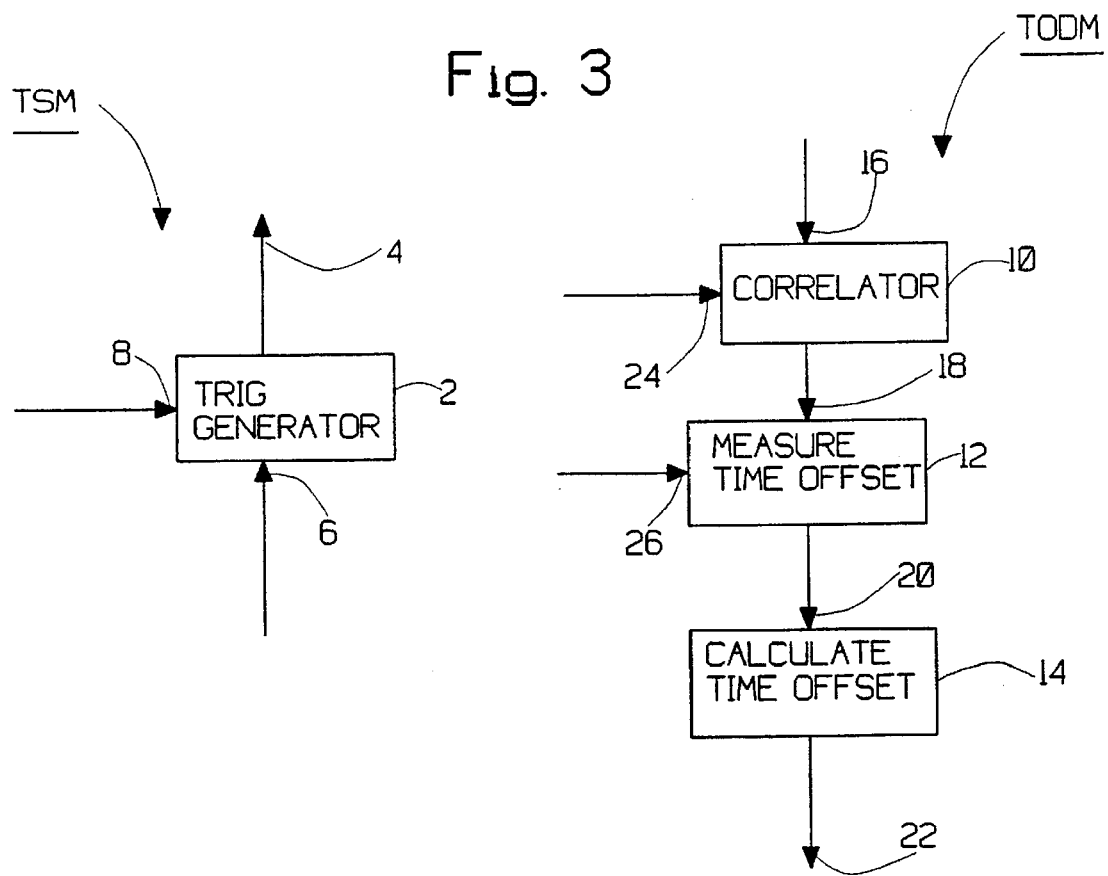
FIG. 4 show two block diagrams illustrating a time shifting means and a time offset determining means.

FIG. 4 shows the time offset determining means TODM, comprising a correlator 10, an apparatus for time measurements 12, and an apparatus for time calculation 14. The correlator 10 obtains the mobile stations MS synchronization word 16 from the mobile communication system and receives the demodulated data 24 from the mobile station MS. At its output the correlator 10 generates correlator trig pulses 18, which are received by the apparatus 12 for time measurements, which also receives frame timing trig pulses 26 corresponding to the timing of the target channel CH2. The apparatus 12 generates at its output a time value 20, indicating the time between frame timing trig pulses 26 and correlator trig pulses 18. This time value 20 is received by the apparatus 14 for time calculation, in which the calculation of the time offset is done, and on which output the time offset 22 is generated. The time offset 22 is essantially identical to the time offset T in FIG. 2.

When the target base station BS2 shall verify the mobile station MS it gets the syncronization word from the mobile communication system.

FIG. 4 also shows the time shifting means TSM, comprising a trig generator 2, which generator 2 receives an internal clock signal 8 from the mobile station MS and an offset value 6. The offset value 6 depends on the calculated time offset 22 in FIG. 4 described above. The trig generator 2 generates at its output start burst trig pulses 4. By changing the offset value 6 the timing of the trig pulses, i.e. the phase of the pulse train, is shifted, and hence the start burst trig pulses 4 can be controlled. The start burst trig pulses 4 is used to initiate and syncronize the transmission from the mobile station MS.

The time shift means TSM is in this embodiment located in the mobile station MS, but it can also be located elsewhere, e.g. in the base stations or in the mobile services switching centre MSC. The time offset determining means TODM is located in the target base station BS2, but can also be located elsewhere in the mobile communication system, e.g. in the mobile station MS.

Syncronization word, time offset, frames and other expressions used in the description of FIG. 4 are well known expressions for those ordinary skilled in the art and are described in the standard TIA-IS-54.

Figure 5:
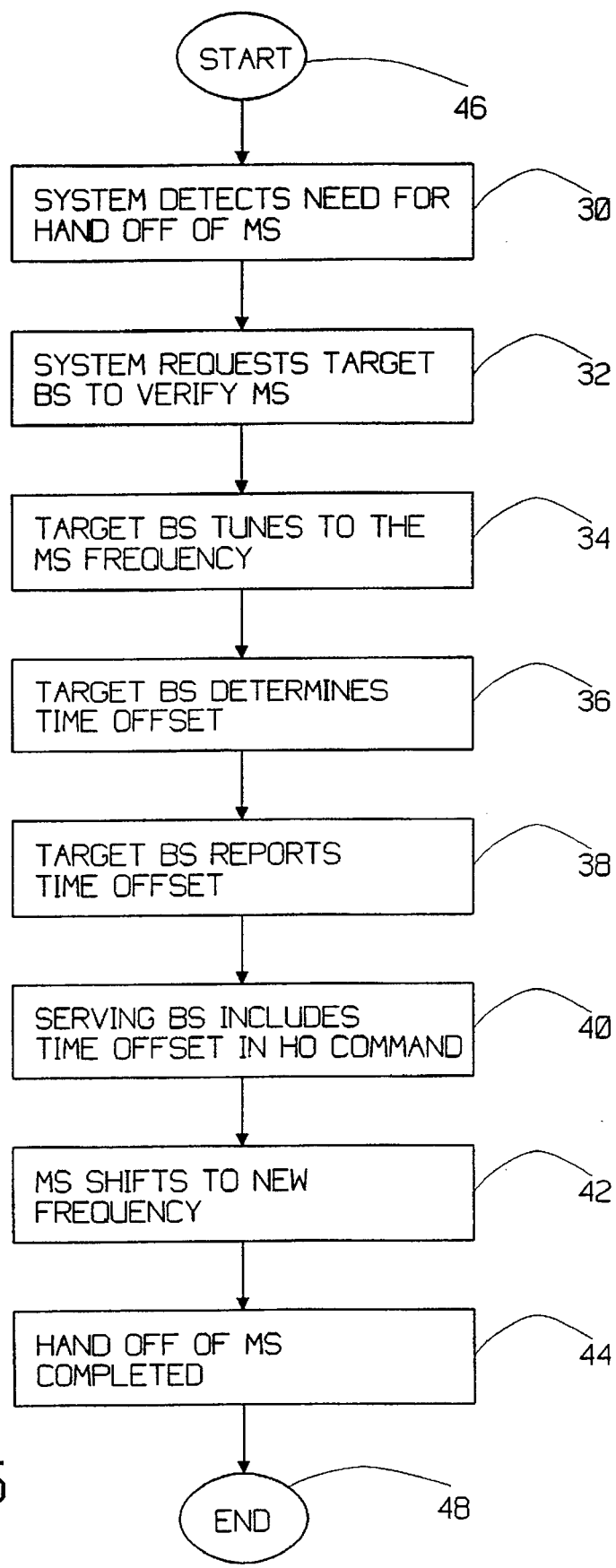
FIG. 5 shows a flow chart illustrating a method for speeding up the process of handoff according to the invention.

FIG. 5 shows a flow chart illustrating the method for speeding up the process of handoff according to the invention. The base station BS1 is serving the mobile station MS and the base station BS2 is acting as target base station, in accordance with FIG. 1. The flow chart starts at step 46. Next, at step 30 the mobile communication system detects the need for handing off the mobile station MS from the serving base station BS1 to a target base station BS2. The detection can be done by measuring the signal strength as has been explained in the description to FIG. 3 above. At step 32 the system requests the target base station BS2 to verify the mobile station MS, which is a well known procedure. During the verification the target base station BS2 tunes at step 34 to the frequency of the mobile station MS and locks onto the syncronization word. At step 34 the target base station BS2 can also optionally verify the identification of the mobile station MS. The flow chart continues with step 36, in which the target base station BS2 determines how much in time the mobile station MS must shift its frame timing in order to fit the frame timing of the new channel served by the target base station BS2. Step 36 is performed in the time offset determining means TODM as described above in the description to FIG. 4. After Step 36 follows step 38, in which the target base station BS2 reports the time offset T determined at step 36, to the mobile communication system, e.g. to the mobile services switching centre MSC or in a GSM-system to a base station controller (BSC), which can control several base stations. At step 40 the serving base station BS1 includes said time offset in the handoff command to the mobile station MS. Next, at step 42 the mobile station MS shifts to the new frequency and, by using said time offset, shifts its burst structure to allow immediate transmission without further measurements. The shift is performed in the time shifting means TSM described above. At step 44 the handoff of the mobile station MS from the serving base station BS1 to the target base station BS2 is performed. The flow chart ends at step 48 which comes after step 44.

According to the invention the target base station BS2 can, by monitoring the transmission between the mobile station MS and the serving base station BS1, measure the time offset T which the mobile station MS must shift its transmission phase to fit the timing in the target base station BS2. The time offset T measured includes both the difference in the timing between the serving base station BS1 and the target base station BS2 and the difference in transmission delay between the serving connection and the target connection due to difference in distance from the mobile station MS to the respective basestation BS1 and BS2.

The mobile station MS receives a handoff command comprising the new channel and the measured time offset T. The mobile station also separately receives an estimated value of the time alignment for the new connection. Since the time offset needed for correct burst syncronization of the transmission of the mobile station thus is given, the mobile station MS does not need to perform a resyncronization prior to transmitting any bursts.

If the method according to the invention is used in a synchronized system, i.e. base station BS1 and BS2 have the same timing, another advantage is that the measured time offset will be the correct difference in time alignment between the current connection and the target connection. Thus, the correct (not estimated) time alignment value for the new connection can be calculated.

According to the invention, a similar procedure can be used in connection with a set-up of a connection between the mobile station MS and a base station. During such a set-up situation, a handoff of the mobile station MS from a control channel to e.g. a digital traffic channel on one and the same base station could be part of the procedure. As indicated above, such a handoff is one possible type of intra-cell handoff. Also in such a case and for other types of intra-cell handoffs, e.g. an intra-cell handoff between two traffic channels, a time-consuming resynchronization of the mobile station will be avoided.

In the above cases of intra-cell handoffs to the same base station, the channels are supposed to be non-synchronized and/or to have a phase difference unknown to the mobile station.

The time offset T that controls the transmission phase shift of the mobile station at handoff does not have to be "exact". It is enough if the time offset controls the mobile station good enough in order for the signal of the mobile station not to collide with the signals of other mobile stations and if the time offset makes it possible to control the transmission phase of the mobile station to within the time window where a synchronization word can be found at once. Hence, the determined time offsets have to be quantized.

By means of the method and the apparatus according to the invention, the disruption of an ongoing speech in connection with a handoff, will be so short that the disruption may easily be masked by a speech decoder (not shown), resulting in a more or less seamless handoff not noticeable by the human ear. A disruption of less than 40 ms has been obtained.

The term handoff used in this application comprises handoffs from a first channel in a serving base station to a second channel in a target base station, handoffs from a control channel to a traffic channel when setting up a connection between a base station and a mobile station, as well as handoffs between traffic channels in a common base station and other possible handoffs.

It is to be understood that the terminology used herein is for the purpose of description and not of limitation.

We claim:

1. In a mobile communication system, a method for handing off a mobile station from a first channel on a serving base station to a second channel on a target base station, transmissions from the mobile station occurring on first time slot on the first channel and on a second time slot on the second channel, comprising the steps of:

determining, at the target base station prior to communication over the second channel, a relative time offset between the first time slot and the second time slot, and shifting the transmission time slot of the mobile station by the determined relative time offset to communicate on the second channel.

2. The method of claim 1, further comprising at least one of the steps of informing the mobile station about the determined time offset and providing the mobile station with information allowing the mobile station to establish the determined relative time offset, prior to a handoff.

3. The method of claim 2, wherein the mobile station, upon a handoff, shifts its transmission phase by the determined relative time offset.

4. The method of claim 1, wherein the serving base station and the target base station are a single base station, and the determined relative time offset is determined in the single base station.

5. The method of claim 1, wherein the determined relative time offset is quantized.

6. In a mobile communication system, an apparatus for handing off a mobile station from a first channel on a serving base station to a second channel on a target base station, the mobile station transmitting on a first time slot on the first channel and transmitting on a second time slot on the second channel, comprising:

means, provided in the target base station for determining, prior to communication over the second channel, a relative time offset between the first time slot and the second time slot, and means for shifting, upon handoff, the transmission time slot of the mobile station by the relative time offset to communicate on the second channel.

7. The apparatus of claim 6, further comprising means for doing one of either informing the mobile station about the relative time offset or providing information allowing the mobile station to establish the relative time offset, prior to communication on the second channel.

8. The apparatus of claim 7, wherein the shifting means is provided in the mobile station and is adapted, upon a handoff, to shift the transmission phase of the mobile station by the relative time offset.

9. The apparatus of claim 6, wherein the serving base station and the target base station are a single base station, and the time offset determining means is provided in the single base station.

10. The apparatus of claim 6, wherein the time offset determining means includes means for quantizing said relative time offset.

* * * * *